United States Patent

Van Vechten

[11] 3,937,209
[45] Feb. 10, 1976

[54] HEAT STORAGE DEVICE

[75] Inventor: James Alden Van Vechten, Basking Ridge, N.J.

[73] Assignee: Bell Telephone Laboratories, Incorporated, Murray Hill, N.J.

[22] Filed: July 12, 1974

[21] Appl. No.: 487,874

[52] U.S. Cl. .................................. 126/375; 126/400
[51] Int. Cl.² ........................................... F24H 7/00
[58] Field of Search ...... 252/70; 126/263, 375, 400; 165/104; 23/301 SP; 122/32

[56] References Cited
UNITED STATES PATENTS

| | | |
|---|---|---|
| 2,791,204 | 5/1957 | Andrus .................................. 122/33 |
| 3,080,706 | 3/1963 | Flynn, Jr. et al. .................... 126/400 |
| 3,163,209 | 12/1964 | Shinn ................................... 126/400 |
| 3,320,408 | 5/1967 | Mekjean ............................... 126/400 |
| 3,642,443 | 2/1972 | Blum .................................. 23/301 SP |
| 3,709,209 | 1/1973 | Schroder .............................. 126/400 |

*Primary Examiner*—Kenneth W. Sprague
*Assistant Examiner*—Larry I. Schwartz
*Attorney, Agent, or Firm*—G. S. Indig

[57] ABSTRACT

A heat storage device of simple design and compact dimensions is disclosed. The device uses a heat storage medium which contracts upon melting and which has a melting point high enough to be of use in connection with conventional, nuclear, and solar power plants.

10 Claims, 1 Drawing Figure

U.S. Patent  Feb. 10, 1976  3,937,209
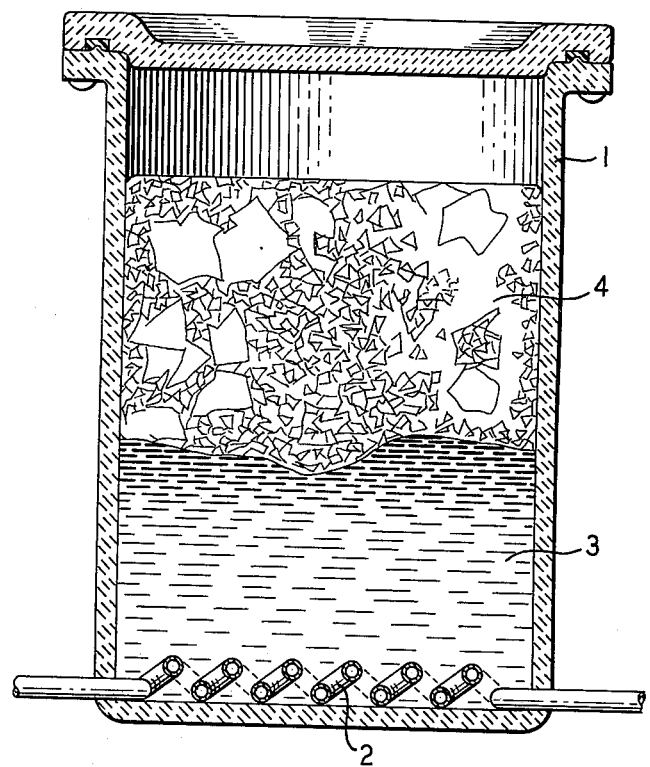

HEAT STORAGE DEVICE

BACKGROUND OF THE INVENTION

1. Field of the Invention

The invention is concerned with devices for the storage of energy, especially of energy available in the form of heat.

2. Description of the Prior Art

The need for energy storage arises in a variety of contexts and on a variety of scales. For example, the problem arises on a small scale with artificial satellites depending on solar energy. Unless equipped with an energy storage device the satellite is without power whenever it is in darkness. On a larger scale, the problem arises with conventional or nuclear power plants. Since such plants are most economically operated at a constant power level, an energy storage device is needed to store energy when demand is low and to release energy when demand is high. One approach in current use is based on converting the energy to be stored into gravitational energy by pumping water into an elevated reservoir when excess energy is available and to use the water to drive a hydroelectric power plant when energy is needed.

An example of such an installation is the storage facility at Ludington, Michigan whose pumps and generators are connected to Michigan's network of power lines. However, due to the need for large tracts of land of suitable topographic situation, this method for storing energy cannot be expected to find wide application.

Another approach currently being studied is based on storing heat directly in the form of latent heat of fusion of a material at its melting point. For this purpose R. J. Hanold et al, in U.S. Pat. No. 3,029,596, advocate the use of lithium salts such as lithium hydride, lithium hydroxide and lithium fluoride. Energy to be stored in the heat reservoir causes some of the solid phase material to melt and energy withdrawn causes some of the liquid phase material to solidify. The selection of any specific material has to be based on its melting point, which ideally should be slightly below the temperature at which heat to be stored is available. Furthermore, for the sake of compactness of the device, the specific heat of fusion of the material should be high. Furthermore, since a high heat of fusion typically goes together with a high melting point, elevated operating temperatures are desirable.

Heat storage devices based on salts such as the lithium compounds mentioned above are much less space consuming than water reservoirs; however, certain difficulties arise with the placement of the heat exchanger out of the fact that the liquid phase of such materials is lighter than the solid phase. It is desirable to effect the exchange of heat between the heat storage medium and the heat source on the one hand, and the heat storage medium and the heat sink on the other, by a compact heat exchanging device in contact with a horizontal layer of the heat storage medium. However, when a salt eutectic is used as heat storage medium, the placement of the heat exchanger poses a dilemma. Specifically, placing the heat exchanger at the bottom of the reservoir, that is, at least partly inside the solid phase of the storage material, leads to a low rate of heat transfer and to mechanical stress during change of phase. Conversely, placing the heat exchanger at the top of the reservoir causes the insertion of heat to be impaired by lack of convection because the heat exchanger is in contact with the warmest layer of the heat storage medium. Even if the heat exchanger were raised and lowered in the liquid phase material depending on whether heat was to be withdrawn or inserted, convection in the liquid phase would counteract rather than promote the exchange of heat between the liquid phase and the solid phase.

SUMMARY OF THE INVENTION

The use of a storage medium whose density in its liquid phase exceeds the density in its solid phase allows the design of simple and efficient heat storage devices. Media with a melting point above 100 degrees C and a high heat of fusion are disclosed.

BRIEF DESCRIPTION OF THE DRAWING

The drawing schematically shows a cross-section of an energy storage device which uses an approximately eutectic mixture consisting essentially of germanium and sulfur as heat storage medium.

DETAILED DESCRIPTION

1. The Figure

The Figure shows reservoir 1 with heat exchanger 2 and containing an approximately eutectic mixture consisting of germanium and sulfur whose liquid phase 3 is of a density greater than that of its solid phase 4.

2. The Mechanism

A material whose liquid phase is of greater density than its solid phase, when heated in a reservoir to its melting point, exhibits a layering of phases with the liquid phase at the bottom of the reservoir. The use of such a material as an energy storage medium circumvents the difficulties arising out of the use of salt eutectics. Specifically, the heat exchange apparatus can be conveniently placed at the bottom of the reservoir where it stays in contact with the liquid phase. Heat is entered into the device through the heat exchange apparatus and causes some of the solid phase material to melt. Conversely, energy is released through the heat exchanger when some of the liquid phase material solidifies. Heat transfer in both directions is aided by convection that is, by the transport of mass. Specifically, heat entered causes liquid material at the bottom of the reservoir to rise to the liquid-solid interface. Conversely, when heat is withdrawn, a solid phase is formed at the heat exchanger and floats to the liquid-solid interface. If necessary, build-up of solid material at the heat exchanger during extraction of heat is prevented by occasional insertion of a small amount of heat to cause the formation of a liquid phase at the surface of the heat exchanger in order to break the adhesive bond between the heat exchanger and the solid phase.

Selection of a specific heat storage medium is essentially dependent on the temperature at which heat is to be stored. In order to assure an essentially constant temperature, the use of substances with a well-defined melting point is indicated. Therefore, chemical elements and compounds and eutectic mixtures are of primary interest. However, the use of near-eutectic mixtures can be used to advantage in order to ensure the presence of a liquid phase at the heat exchanger to inhibit solid phase build-up during heat extraction.

For the sake of compactness of the heat storage device, a high heat of fusion is desirable and, in the interest of an efficient heat exchange, the medium in its liquid phase should have a high heat conductivity. One class of materials from which suitable media can be selected consists of those materials which are tetrahedrally coordinated in their solid state and metallic in their liquid state. Examples of such materials are germanium with a melting point of 937° C and a heat of fusion of 651 cal/cm$^3$, and silicon with a melting point of 1412° C and a heat of fusion of 998 cal/cm$^3$. Further, materials falling in this class are AlSb, GaAs, GaSb, InSb, BP, AlP, GaP, InP, AlN, $CdSnP_2$, $CdSnSb_2$, $CdGeSb_2$, $CdGeAs_2$, $CdGeP_2$, and $ZnSiP_2$.

Existing conventional power plants typically use steam turbines driven by super-heated steam at a temperature from 550°–600° C. At such a temperature the eutectic mixture of 40 percent germanium and 60 percent sulfur is particularly suitable for heat storage because it has a eutectic temperature of 590° C. In its solid phase this material has a consistency similar to soap flakes, a consistency which prevents the material from sticking to the heat exchanger.

An undesirable tendency of this material towards the formation of a glassy phase is easily counteracted by the addition of small amounts of Ca, Sr, Ba, Mg, Sn, or Bi. In fact, commercially available, inexpensive raw materials typically contain amounts of some of these elements as impurities sufficient to prevent glass formation.

At a considerably higher temperature elemental germanium may become of practical interest. In fact, a nuclear power plant operating at 1000° C, i.e., at a temperature slightly below the melting point of germanium, is in operation at Juelich, Germany.

What is claimed is:

1. Heat storage device comprising a reservoir containing a heat storage medium, means for inserting and extracting heat from said medium, characterized in that
   1. said medium is a material whose density in its liquid phase exceeds that in its solid phase,
   2. said material has a range of melting temperatures above 100° C and
   3. said means for inserting and extracting heat are placed in proximity of the lower end of said reservoir.

2. Device of claim 1 in which said medium is a chemical compound.

3. Device of claim 2 in which said chemical compound is tetrahedrally coordinated in its solid phase and metallic in its liquid phase.

4. Device of claim 3 in which said chemical compound is selected from the group consisting of AlSb, GaAs, GaSb, InSb, BP, AlP, GaP, InP, AlN, $CdSnP_2$, $CdSnSb_2$, $CdGeSb_2$, $CdGeAs_2$, $CdGeP_2$, and $ZnSiP_2$.

5. Device of claim 1 in which said medium is a chemical element.

6. Device of claim 5 in which said chemical element is selected from the group consisting of Bi, Ge, and Si.

7. Device of claim 1 in which said medium is an approximate eutectic mixture of at least two media which have an ordered structure in their solid phase.

8. Device of claim 7 in which said approximate eutectic mixture is essentially a mixture of Ge and S.

9. Device of claim 8 in which said approximate eutectic mixture contains a total of up to 10 percent by weight of at least one element selected from the group consisting of Ca, Sr, Ba, Mg, Sn, and Bi.

10. Device of claim 1 in which said material has a range of melting temperatures above 500° C and a specific heat of fusion of at least 300 cal/cm$^3$.

* * * * *